US012747373B2

(12) United States Patent
Wiegers et al.

(10) Patent No.: US 12,747,373 B2
(45) Date of Patent: Sep. 29, 2026

(54) HEAT-ACTIVATABLE LINERLESS LABEL CONSTRUCTIONS

(71) Applicant: Avery Dennison Corporation, Mentor, OH (US)

(72) Inventors: Ronald Wiegers, 's-Hertogenbosch (NL); Hidde R. Van Der Horst, Leiderdorp (NL); Antoine Briand, Haarlem (NL); Marina Carrer, Leiden (NL); Sara Mehretab, Zogno (IT)

(73) Assignee: Avery Dennison Corporation, Mentor, OH (US)

( * ) Notice: Subject to any disclaimer, the term of this patent is extended or adjusted under 35 U.S.C. 154(b) by 31 days.

(21) Appl. No.: 18/687,866

(22) PCT Filed: Oct. 11, 2022

(86) PCT No.: PCT/IB2022/059756
§ 371 (c)(1),
(2) Date: Feb. 29, 2024

(87) PCT Pub. No.: WO2023/062544
PCT Pub. Date: Apr. 20, 2023

(65) Prior Publication Data

US 2025/0034432 A1 Jan. 30, 2025

Related U.S. Application Data

(60) Provisional application No. 63/376,299, filed on Sep. 20, 2022, provisional application No. 63/364,149,
(Continued)

(51) Int. Cl.
*C09J 5/06* (2006.01)
*C09J 7/38* (2018.01)
*G09F 3/02* (2006.01)

(52) U.S. Cl.
CPC . *C09J 5/06* (2013.01); *C09J 7/38* (2018.01); *G09F 3/02* (2013.01); *C09J 2301/12* (2020.08);
(Continued)

(58) Field of Classification Search
CPC ..... C09J 7/38; C09J 5/06; C09J 5/0016; C09J 5/103; C09J 5/00; C09J 2301/12;
(Continued)

(56) References Cited

U.S. PATENT DOCUMENTS 2,462,029 A 2/1949 Perry
3,247,041 A 4/1966 Henderson
(Continued)

FOREIGN PATENT DOCUMENTS

EP 2393665 3/2015
EP 2938684 9/2017
(Continued)

OTHER PUBLICATIONS

International Search Report and Written Opinion dated Mar. 15, 2023 issued in corresponding IA No. PCT/IB2022/059756 filed Oct. 11, 2022.
(Continued)

*Primary Examiner* — Laura C Powers

(57) ABSTRACT

Heat-activatable, linerless labelstock constructions with a detack layer are disclosed. Methods of preparing the same are disclosed.

15 Claims, 2 Drawing Sheets

Related U.S. Application Data filed on May 4, 2022, provisional application No. 63/255,988, filed on Oct. 15, 2021.

(52) U.S. Cl.
CPC . *C09J 2301/408* (2020.08); *G09F 2003/0241* (2013.01); *G09F 2003/025* (2013.01)

(58) Field of Classification Search
CPC . C09J 2301/408; C09J 2203/334; G09F 3/02; G09F 2003/0241; G09F 2003/025
See application file for complete search history.

(56) References Cited

U.S. PATENT DOCUMENTS

| | | | |
|---|---|---|---|
| 3,461,014 | A | 8/1969 | James |
| 4,156,626 | A | 5/1979 | Souder |
| 4,468,274 | A | 8/1984 | Adachi |
| 4,784,714 | A | 11/1988 | Shibata |
| 5,480,502 | A | 1/1996 | Rello et al. |
| 5,749,990 | A | 5/1998 | Rello et al. |
| 5,895,552 | A | 4/1999 | Matsuguchi |
| 5,922,169 | A | 7/1999 | Chodacki et al. |
| 5,964,975 | A | 10/1999 | Hinton |
| 6,006,808 | A | 12/1999 | Ewert et al. |
| 6,031,553 | A | 2/2000 | Nagamoto et al. |
| 6,388,692 | B1 | 5/2002 | Iwata et al. |
| 6,471,802 | B1 | 10/2002 | Williamson |
| 6,501,495 | B1 | 12/2002 | Ichikawa et al. |
| 6,899,155 | B2 | 5/2005 | Francke et al. |
| 7,029,549 | B1 | 4/2006 | Von Falkenhausen et al. |
| 7,955,678 | B2 | 6/2011 | Stogbauer et al. |
| 8,927,100 | B2 | 1/2015 | Kian et al. |
| 10,573,204 | B2 | 2/2020 | Mallya et al. |
| 2002/0029843 | A1 * | 3/2002 | Popat .................... B44C 1/1733 156/289 |
| 2013/0171444 | A1 * | 7/2013 | Cho ........................... C09J 7/22 428/323 |
| 2015/0275052 | A1 | 10/2015 | Cho et al. |

FOREIGN PATENT DOCUMENTS

| | | |
|---|---|---|
| WO | 02/34853 | 5/2002 |
| WO | 2016/109199 | 7/2016 |
| WO | 2020/154105 | 7/2020 |

OTHER PUBLICATIONS

Invitation to Pay Additional Fees dated Jan. 20, 2023 issued in corresponding IA No. PCT/IB2022/059756 filed Oct. 11, 2022.

* cited by examiner

HEAT-ACTIVATABLE LINERLESS LABEL CONSTRUCTIONS

CROSS-REFERENCE TO RELATED APPLICATION

The present application is a national stage application under 37 U.S.C. § 371 of International Application No. PCT/IB2022/059756 which was published in English on Apr. 20, 2023, and claims the benefit of U.S. Provisional Patent Application Nos. 63/376,299, filed Sep. 20, 2022, 63/364,149 filed May 4, 2022, and 63/255,988 filed Oct. 15, 2021, each of which is incorporated by reference herein in its entirety.

TECHNICAL FIELD

This disclosure generally relates to heat-activatable, linerless, pressure-sensitive labels and roll stock, and to methods of making and using the labels and roll stock. More particularly, this disclosure relates to the use of a detack layer with heat-activatable, pressure-sensitive adhesives in linerless label constructions.

BACKGROUND

Since the introduction of the pressure-sensitive label construction by R. Stanton Avery in 1934, the labeling industry has long since looked for a replacement of the release liner by other means, primarily for cost-reasons. In recent years, the demand for more sustainable solutions and less waste is becoming stronger.

A delayed tack adhesive useful for forming a heat-activatable layer or overlaminate film which includes polymers that normally do not possess open tack, but are mixed with one or more solid plasticizer are known. When melted, the solid plasticizer causes the nontacky polymer to become tacky, and remains liquid for some time after cooling to provide an open tack.

Further, a label facestock with a pressure-sensitive adhesive applied to one side of the face layer is known. Then, on the pressure-sensitive adhesive, a detack layer is applied, which contains solid plasticizer particles and/or solid tackifier particles is applied. Upon heating the detack layer, the molten plasticizer and/or tackifier cause the resulting combined detack and adhesive layer to become sticky.

A detack layer with an aqueous dispersion containing a dispersed plasticizer and a binder dispersion is known and used. The detack layer is traditionally coated on top of a pressure-sensitive layer and dried. Upon heating, the plasticizer in the dispersion melts and combines with the adhesive layer. The binder can be an ethylene-acrylic acid copolymer, and needs to be used in a plasticizer:binder ratio of maximum 12:1 (at least 7.7 weight % binder).

The advantage of a label with an activatable adhesive system is that the label does not require any release agent, such as silicones, to counteract the stickiness of a pressure-sensitive adhesive, and thus is well printable with conventional printing techniques and inks. There is therefore a need for a heat-activatable, linerless label construction containing a non-blocking detack layer with a quick activation window. The label constructions, labelstock, and methods of the present disclosure and exemplary embodiments are directed toward these, as well as other, important ends.

SUMMARY

Exemplary embodiments relate generally to label constructions, labelstock, and methods use of a detack layer.

One exemplary embodiment is directed to heat-activatable labelstock, comprising: a face layer having a first surface and a second surface opposite the first surface; an optional barrier layer or optional primer layer, each with a first surface and a second surface opposite the first surface, the second surface in direct contact with the first surface of the face layer; a pressure-sensitive adhesive layer having a first surface and a second surface; wherein the adhesive layer is deposited on the first surface of the face layer, or, when the optional barrier layer or primer layer is present, on the first surface of the barrier layer or the primer layer; a detack layer; wherein the detack layer is deposited on the second surface of the adhesive layer; and wherein the detack layer comprises a dispersed plasticizer and a non-ionic polymeric binder.

Another exemplary embodiment is directed to heat-activatable labelstock, comprising: a face layer having a first surface and a second surface opposite the first surface; an optional barrier layer or optional primer layer, each with a first surface and a second surface opposite the first surface, the second surface being in direct contact with the first surface of the face layer; a pressure-sensitive adhesive layer having a first surface and a second surface; wherein the pressure-sensitive adhesive layer is deposited on the first surface of the face layer; or, when the optional barrier layer or optional primer layer is used, on the first surface of the barrier layer or the primer layer; a detack layer; wherein the detack layer is deposited on the second surface of the adhesive layer; wherein the detack layer comprises a dispersed plasticizer and a polymeric binder; and wherein a weight ratio of the plasticizer to the polymeric binder in the detack layer is greater than 15:1 (maximum 6.25 weight % binder/plasticizer).

Yet another exemplary embodiment is directed to self-adhesive label material, obtained by heating a heat-activatable labelstock.

An additional exemplary embodiment is directed to methods of preparing a labelstock comprising a face layer and an adhesive layer, comprising: melt-emulsifying a plasticizer and a polymeric binder at a temperature above the melting point of the plasticizer to form an emulsified dispersion; and applying the emulsified dispersion to the adhesive layer to form a detack layer on the adhesive layer.

A further exemplary embodiment is directed to methods of preparing a labelstock comprising a face layer, comprising: melt-emulsifying a plasticizer and a polymeric binder at a temperature above the melting point of the plasticizer to form an emulsified dispersion; and simultaneously applying the emulsified dispersion and an adhesive layer to form a detack layer on the adhesive layer; wherein the adhesive layer is between the face layer and the detack layer.

Yet another exemplary embodiment is directed to a labelstock, comprising a face layer, with a first surface and a second surface opposite the first surface, a pressure sensitive adhesive with a first surface and a second surface, said pressure sensitive adhesive deposited on the first surface of the face layer whereby the first surface of the pressure sensitive adhesive is in direct contact with the first surface of the face layer, and a detack layer deposited on the second surface of the pressure sensitive adhesive, wherein the detack layer comprises plasticizer crystals, characterized in that the plasticizer crystals have a high aspect ratio.

Yet a further exemplary embodiment is directed to a labelstock, comprising: a face layer having a first surface and a second surface opposite the first surface; a pressure sensitive adhesive layer deposited on the first surface of the face layer having a first surface and a second surface; and a detack layer deposited on the second surface of the pressure sensitive adhesive layer comprising: a plasticizer wherein at least a portion of the plasticizer is in the form of crystals and the plasticizer crystals have an aspect ratio between about 3 and about 100; and a polymeric binder.

An additional exemplary embodiment is directed to a method comprising: activating a detack layer of a labelstock above a melting point of a plasticizer contained in the detack layer of said labelstock; relaxing the detack layer below the melting point of the plasticizer contained in the detack layer; and controlling precisely the heating or cooling steps in order to obtain at least a portion of the plasticizer in crystalline form with the aspect ratio of the plasticizer crystals between about 3 and about 100.

The summary is provided as a general introduction to some of the exemplary embodiments, and is not intended to be limiting. Additional example embodiments, including variations and alternative configurations are provided herein.

BRIEF DESCRIPTION OF THE DRAWINGS

The accompanying drawings, which are included to provide a further understanding and are incorporated in and constitute a part of this specification, illustrate embodiments and together with the description serve to explain the principles. In the drawings.

DETAILED DESCRIPTION OF THE ILLUSTRATED EMBODIMENTS

Figure 1:
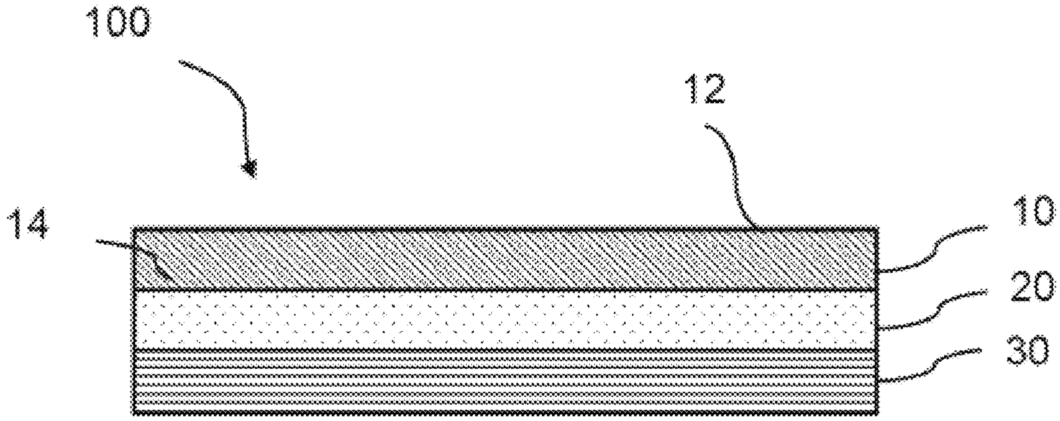
FIG. 1 illustrates an exemplary labelstock construction as described herein, including the face layer, the pressure-sensitive adhesive layer, and detack layer described herein.

Exemplary solutions described herein are designed to meet the deficiencies of known solutions within the field. These deficiencies can include but are not limited to those discussed hereinafter. Generally, delayed tack adhesive have been used in heat-activatable systems, but they have not had wide success due to high production costs, particularly due to the wet milling of the solid plasticizers used in the original systems. Additionally, the handling of powders in a roll-to-roll environment at high speed resulted in the creation of dust and issues with associated hazards related to the generated dust. Further, when a high proportion of binder was used (approximately 8% and above) a relatively slow activation and poor tack results, as the binder does not partake in the adhesive process.

Definitions

As employed above and throughout the disclosure, the following terms, unless otherwise indicated, shall be understood to have the following meanings.

As used herein, the terms "comprises," "comprising," "includes," "including," "has," "having" or any other variation thereof, are intended are open-ended and cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" is employed to describe elements and components described herein. This is done merely for convenience and to give a general sense of the scope of a particular exemplary embodiment. This description should be read to include "one" or "at least one" and the singular also includes the plural, unless it is obvious that it is meant otherwise by the context. As used herein, the term "about," when referring to a measurable value such as an amount, a temporal duration, and the like, is meant to encompass variations of ±10%, preferably, ±8%, more preferably, ±5%, even more preferably, ±1%, and yet even more preferably, ±0.1% from the specified value, as such variations are appropriate to perform the disclosed methods.

As used herein, "pressure-sensitive adhesive" or "PSA" refers to a material that may be identified by the Dahlquist criterion, which defines a pressure-sensitive adhesive as an adhesive having a one second creep compliance of greater than $1\times10^{-6}$ cm$^2$/dyne as described in *Handbook of PSA Technology*, Donatas Satas (Ed.), 2$^{nd}$ Edition, page 172, Van Nostrand Reinhold, New York, N.Y., 1989. Since modulus is, to a first approximation, the inverse of creep compliance, pressure-sensitive adhesives may also be defined as adhesives having a Young's modulus of less than $1\times10^6$ dynes/cm$^2$. Another well-known means of identifying a pressure-sensitive adhesive is an adhesive that it is aggressively and permanently tacky at room temperature and firmly adheres to a variety of dissimilar surfaces upon mere contact without the need of more than finger or hand pressure, and which may be removed from smooth surfaces without leaving a residue, as described in *Glossary of Terms Used in the Pressure-sensitive Tape Industry* provided by the Pressure-sensitive Tape Council, 1996. Another suitable definition of a suitable pressure-sensitive adhesive is that it preferably has a room temperature storage modulus within the area defined by the following points as plotted on a graph of modulus versus frequency at 25° C.: a range of moduli from about 2×105 to 4×105 dynes/cm$^2$ at a frequency of about 0.1 radians/see (0.017 Hz), and a range of moduli from about $2\times10^6$ to $8\times10^6$ dynes/cm$^2$ at a frequency of approximately 100 radians/see (17 Hz). See, for example, *Handbook of PSA Technology* (Donatas Satas, Ed.), 2$^{nd}$ Edition, page 173, Van Nostrand Rheinhold, N.Y., 1989. Any of these methods of identifying a pressure-sensitive adhesive may be used to identify suitable pressure-sensitive adhesives for use in the film constructions of exemplary embodiments.

"Non-ionic," as used herein with respect to the polymer binder, means that the polymeric binder does not essentially dissociate into ions, either in the liquid dispersion, or in the dried, coated state.

The term "gsm" means g/m$^2$.

All percentages noted herein are percentages by weight based upon the weight of the composition, unless indicated otherwise.

Labelstock Constructions

FIG. 1 illustrates an exemplary heat-activable labelstock construction as described herein. The labelstock construction 100 includes a face layer 10, pressure-sensitive adhesive layer 20, and detack layer 30, as described herein (and not shown to scale). The face layer 10 defines a first surface 14 and an oppositely directed second surface 12. The face layer 10 is shown as a single layer but may be multilayer. The pressure-sensitive adhesive layer 20 is applied over at least a portion of the first surface 14. The pressure sensitive adhesive layer 20 is shown as a single layer but in further exemplary embodiments may be deployed as a multilayer construction.

In one aspect, an exemplary embodiment relates to heat-activatable labelstock, comprising: a face layer having a first surface and a second surface opposite the first surface; an optional barrier layer or optional primer layer, each with a first surface and a second surface opposite the first surface the second surface in direct contact with the first surface of the face layer and a pressure-sensitive adhesive layer having a first surface and a second surface; wherein the adhesive layer is deposited on the first surface of the face layer, or, when the optional barrier layer or primer layer is present, on the first surface of the barrier layer or the primer layer; a detack layer; wherein the detack layer is deposited on the second surface of the adhesive layer; and wherein the detack layer comprises a dispersed plasticizer and a non-ionic polymeric binder.

In another aspect, an exemplary embodiment is directed to heat-activatable labelstock, comprising: a face layer having a first surface and a second surface opposite the first surface; an optional barrier layer or optional primer layer, each with a first surface and a second surface opposite the first surface, the second surface being in direct contact with the first surface of the face layer; and a pressure-sensitive adhesive layer having a first surface and a second surface; wherein the pressure-sensitive adhesive layer is deposited on the first surface of the face layer; or, when the optional barrier layer or optional primer layer is used, on the first surface of the barrier layer or the primer layer; and a detack layer; wherein the detack layer is deposited on the second surface of the adhesive layer; wherein the detack layer comprises a dispersed plasticizer and a polymeric binder; and wherein a weight ratio of the plasticizer to the polymeric binder in the detack layer is greater than 15:1 (maximum 6.25 weight % binder/plasticizer).

Plasticizers

A plasticizer is broadly defined as a typically organic composition that can be added to rubbers and other resins to improve extrudability, flexibility, workability, or stretchability. Typical plasticizers in adhesives are plasticizing oils that are liquid at ambient temperature. Exemplary plasticizers useful in the detack layer are typically a solid composition at ambient temperature.

An exemplary class of plasticizers comprises a cyclo-aliphatic or aromatic ester of a benzene dicarboxylic acid. Such plasticizers are prepared by forming an ester from a cyclo-aliphatic or aromatic alcohol such as cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acids, 1,3-benzene dicarboxylic acid (isophthalic acid), or 1,4-benzene dicarboxylic acid (terephthalic acid). Additional embodiments may implore specific plasticizers of this class such as dicyclohexyl phthalate, diphenyl phthalate or dicyclohexyl orthophthalate.

A second exemplary class of plasticizers comprise an aromatic carboxylic acid ester of a cycloaliphatic polyfunctional alcohol having 2 to 10 hydroxy groups. Specific examples of hydroxy compounds include 1,4-cyclohexane dimethanol, and other useful cycloaliphatic polyfunctional hydroxyl compounds. Aromatic carboxylic acids that can be used with the cycloaliphatic polyfunctional alcohols to form this class of ester plasticizer compounds typically have at least one aromatic group and at least one carboxyl function. Exemplary acids include but are not limited to: benzoic acid, naphthanoic acid, and 4-methyl benzoic acid.

A third exemplary class of plasticizer are benzoates. These plasticizers are typically solid at room temperature, namely with a melting point above about 60° C. Alternatively, in addition to a melting point, a softening point can be determined. This softening point can depend on the nature and purity of the material. Softening points can be measured using the Ring & Ball method. These methods can include those defined as ASTM D 3461-76, DIN ISO 4625. Exemplary embodiments of this third class include include sucrose benzoate with a softening point of 98° C., glycerol tribenzoate with a softening point of 71° C., pentaerythritol tetrabenzoate with a melting point of 102° C. and cyclohexane dimethanol dibenzoate compounds. A specific plasticizer includes 1,4-cyclohexane dimethanol dibenzoate and has a softening point of 118° C. commercially available from Eastman Chemical under the name Benzoflex 352. Exemplary plasticizers of this class provide a desired combination of non-blocking activity and activation speed.

Plasticizers suitable in exemplary embodiments are generally slow to recrystallize. Slow recrystallization is important, as materials that recrystallize immediately after being exposed to elevated temperatures will have an impact on the open time of the activated adhesive, i.e. the time during which the activated adhesive is still tacky upon cooling down to ambient temperatures.

While it is important to have slow recrystallization to promote open time of the activated adhesive, for the purpose of producing the linerless construct, it is important to have fast recrystallization. Plasticizer that has not yet fully crystallized has the tendency to rapidly activate the adhesive. This is the reason why in the existing art of producing delayed tack adhesive the plasticizer has always been produced by the so-called wet grinding process, which is cumbersome and expensive to execute.

There is therefore a need to provide a plasticizer dispersion made by the melt-emulsification method, that recrystallizes fast enough to prevent premature activation of the linerless construct, but has sufficient compatibility with the adhesive polymer to provide ample open time.

In order to speed up the rate at which the crystallization of the plasticizer during the cooling down phase occurs, without impairing the activatability of the linerless construct, certain additives can be incorporated in the molten plasticizer. In order to be an effective crystallization promoting additive, the crystallization speed of the plasticizer needs to be increased by at least a factor 8, more preferably by at least a factor 20, and most preferably by at least a factor 40. In exemplary embodiments, long-chain (10 or more carbon atoms in the chain) aliphatic esters of aliphatic polyols are found suitable to increase the solidification speed without impairing the open time of the activated adhesive. A polyol is an organic compound containing multiple hydroxyl groups. Each of these hydroxyl groups can be reacted with a carboxylic acid to form an ester. Examples of suitable polyols are for example glycerol, polyglycerol, ethylene glycol, polyethylene glycol, propylene glycol, polypropylene glycol and combinations thereof. Especially suitable are long-chain aliphatic esters of polyols that are not completely esterified, but in which at least one hydroxyl group has not reacted with a carboxylic acid, but is in its-OH form.

Suitable long-chain aliphatic esters of polyols may include but are not limited to: glycerol monostearate (glycerol 1- or 2-octadecanoate), glycerol distearate (glycerol 1,2- or 1,3-glycerol dioctadecanoate), glycerol mono-oleate, glycerol dioleate, glycerol monolaurate (monolaurin, 2,3-dihydroxy propyl dodecanoate), glycerol dilaurate (dilaurin), glycerol monodecanoate (monocaprin, monodecanoyl glycerol, 2,3-dihydroxy propyl decanoate), monomyristin (monotetradecanoyl glycerol, 2,3-dihydroxypropyl tetradecanoate), monopalmitin (monohexadecanoyl glycerol, 2,3-dihydroxypropyl hexadecanoate), polyglycerol octanoate, polyglycerol decanoate, polyglycerol dodecanoate (polyglycerol laurate), polyglycerol tetradecanoate (polyglycerol myristate), polyglycerol hexadecanoate (polyglycerol palmitate), polyglycerol octadecanoate (polyglycerol stearate), polyglycerol oleate, polyglyceryl-2 caprate, polyglyceryl-2 caprylate, polyglyceryl-2 laurate, polyglyceryl-2 myristate, polyglyceryl-2 isopalmitate, polyglyceryl-2 palmitate, polyglyceryl-2 isostearate, polyglyceryl-2 oleate, polyglyceryl-2 stearate, polyglyceryl-3 caprate, polyglyceryl-3 caprylate, polyglyceryl-3 laurate, polyglyceryl-3 myristate, polyglyceryl-3 palmitate, polyglyceryl-3 isostearate, polyglyceryl-3 oleate, polyglyceryl-3 stearate, polyglyceryl-3 ricinoleate, polyglyceryl-4 caprate, polyglyceryl-4 caprylate, polyglyceryl-4 laurate, polyglyceryl-4 isostearate, polyglyceryl-4 oleate, polyglyceryl-4 stearate, polyglyceryl-5 caprate, polyglyceryl-5 laurate, polyglyceryl-5 myristate, polyglyceryl-5 isostearate, polyglyceryl-5 oleate, polyglyceryl-5 stearate, polyglyceryl-5 ricinoleate, polyglyceryl-6 caprate, polyglyceryl-6 caprylate, polyglyceryl-6 undecylenate, polyglyceryl-6 laurate, polyglyceryl-6 myristate, polyglyceryl-6 palmitate, polyglyceryl-6 isostearate, polyglyceryl-6 oleate, polyglyceryl-6 stearate, polyglyceryl-6 ricinoleate, polyglyceryl-8 oleate, polyglyceryl-8 stearate, polyglyceryl-10 caprate, polyglyceryl-10 caprylate, polyglyceryl-10 undecylenate, polyglyceryl-10 laurate, polyglyceryl-10 myristate, polyglyceryl-10 palmitate, poly glyceryl-10 isostearate, polyglyceryl-10 linoleate, poly glyceryl-10 oleate, polyglyceryl-10 stearate, polyglyceryl-4 dilaurate, polyglyceryl-4 pentaoleate, polyglyceryl-4 distearate, polyglyceryl-4 tristearate, polyglyceryl-4 pentastearate, polyglyceryl-5 dicaprylate, polyglyceryl-5 dilaurate, polyglyceryl-5 trimyristate, polyglyceryl-5 pentamyristate, polyglyceryl-5 triisostearate, polyglyceryl-5 dioleate, polyglyceryl-5 trioleate, polyglyceryl-5 tristearate, polyglyceryl-5 hexastearate, polyglyceryl-6 sesquicaprylate, polyglyceryl-6 dicaprate, polyglyceryl-6 tricaprylate, polyglyceryl-6 tetracaprylate, polyglyceryl-6 pentacaprylate, polyglyceryl-6 heptacaprylate, polyglyceryl-6 octacaprylate, polyglyceryl-6 dipalmitate, polyglyceryl-6 sesquiisostearate, polyglyceryl-6 diisostearate, polyglyceryl-6 dioleate, polyglyceryl-6 tetraoleate, polyglyceryl-6 pentaoleate, polyglyceryl-6 hexaoleate, polyglyceryl-6 sesqui stearate, polyglyceryl-6 distearate, polyglyceryl-6 tristearate, polyglyceryl-6 pentastearate, polyglyceryl-6 hexastearate, polyglyceryl-6 octastearate, polyglyceryl-6 pentaricinoleate, polyglyceryl-6 tetrabehenate, and combinations thereof.

If the amount of long-chain aliphatic ester of an aliphatic polyol is below 0.5% (calculated as the weight/weight percentage based on the amount of plasticizer), the crystallization speed effect is insufficient to be practical. Further, higher amounts (above 25%) will lead to poor open time due to rapid crystallization of the activated material. In exemplary embodiments, concentrations of long-chain aliphatic ester of an aliphatic polyol lie between about 0.8 and about 10% as a percentage based on the amount of plasticizer. In other exemplary embodiments, concentrations of long-chain aliphatic ester of an aliphatic polyol lie between about 1 and about 7.5% as a percentage based on the amount of plasticizer. In yet another embodiment, concentrations of long-chain aliphatic ester of an aliphatic polyol lie between about 1.5 and about 5.5% as a percentage based on the amount of plasticizer.

The function of the plasticizer of the exemplary embodiments in the detack layer is to melt during the heat activation step. Thus, exemplary embodiments of plasticizing materials provided herein are solid at ambient temperatures, in which ambient temperatures can be maximum 50° C., in order to avoid blocking and premature activation. Further, the melting point of the plasticizer should not be too high either, as the required activation temperature will increase with the melting point, and with that also the amount of energy and power that needs to be supplied to the activation unit. Exemplary embodiments of the plasticizers therefore have a melting point between about 50 and about 150° C. Additional embodiments of the plasticizers have a melting point between about 60 and about 130° C. Further embodiments of the plasticizers have a melting point between 7° and 120° C.

For making a dispersion, a dispersant may be used Dispersants for dispersing solids and/or liquids are well known in the art. Exemplary embodiments use dispersants that have little or no influence on the properties of the detack layer, in particular in its anti-block function and in its activation properties. Non-limiting examples of search dispersants are acrylic polymeric dispersants, acetylene-based dispersants, polymeric and non-polymeric non-ionic dispersants and the like. A conventional pigment dispersant typified by polymeric dispersants and surfactants is preferably used to ensure stable dispersion of the plasticizer in the detack layer.

Examples of exemplary commercially-available polymeric dispersants include the TEGO DISPERS series manufactured by Evonik Industries AG (examples of which include TEGO DISPERS 740 W, TEGO DISPERS 750 W, TEGO DISPERS 755 W, TEGO DISPERS 757 W and TEGO DISPERS 760), the SOLSPERSE series manufactured by The Lubrizol Corporation (examples of which include SOLSPERSE W200, SOLSPERSE 20000, SOLSPERSE 27000, SOLSPERSE 41000, SOLSPERSE 41090, SOLSPERSE 43000, SOLSPERSE 44000, SOLSPERSE 46000 and SOLSPERSE 47000), the JONCRYL HPD series manufactured by BASF (examples of which include JONCRYL HPD 71, JONCRYL HPD 96, JONCRYL HPD 196 and JONCRYL HPD 296), as well as DISPERBYK-102, DISPERBYK-185, DISPERBYK-190, DISPERBYK-193 and DISPERBYK-199 manufactured by BYK Additives & Instruments gbH. In an exemplary embodiment, the polymeric dispersant has a glass transition of temperature of 70° C. or higher, these may include but are not limited to JONCRYL HPD71 ($T_g$ of 124° C.) or JONCRYL HPD 96 ($T_g$ 88° C.).

As the person skilled in the art will know, the amount of dispersant required for a stable dispersion will vary by plasticizer and by dispersant. For example, when using a polymeric dispersant to disperse a hydrophobic solid, at least 10 weight % dispersant per unit weight of plasticizer will be required, sometimes more than 20 weight %. Too much dispersant will lead to a lower activation speed, and it is desired in exemplary embodiments to be below 60 weight % dispersant per unit weight of plasticizer, additional embodiments can provide below 50 weight % dispersant per unit weight of plasticizer, and further embodiments may provide for below 40 weight % dispersant per unit weight of plasticizer.

As an aid for better particle size distribution, emulsification speed and dispersion stability, one or more emulsifying surfactants can be added.

In one embodiment, an exemplary type of surfactant is a sulfate of an ethoxylated alcohol, e.g., a sodium lauryl ether sulfate. Further non-limiting examples include but are not limited to: Disponil FES 77 and Disponil FES 993 from Cognis Corp., and Makon TSP-40 N and Polystep B-19 from Stepan Company and Emulsogen TS290 and Emulsogen 540 from Clariant Corp.

A second type of exemplary surfactant is, a sulfosuccinate or derivative, e.g., a dioctyl ester of sodium sulfosuccinic acid. Further non-limiting examples include but are not limited to: Aerosol OT-75 from Cytec Industries, Inc. and Disponil SUS IC 875 from Cognis Corp. In another exemplary embodiment, the second type of surfactant is a modified fatty alcohol polyglycolether. Further non-limiting examples include but are not limited to: Disponil AFX 1080 and Disponil AFX 2075 from Cognis Corp.

As with the dispersant, the amount of emulsifying surfactant required for a stable dispersion will vary per plasticizer and per emulsifying surfactant. In one embodiment, per unit weight of plasticizer, the amount of emulsifying surfactant lies between about 0.1% and about 10%, in a further embodiment it may be between about 0.5% and about 5%, and in yet another embodiment it may be between about 1% and about 4%.

Polymeric Binder

An essential component for the detack layer is at least one polymeric binder. Polymeric binders provide a means of dispersion stability and viscosity control.

The inventors have found that choosing the right binder is important for the quality of the heat-activatable linerless labelstock. If the polymeric binder is omitted, or if the polymeric binder does not provide sufficient binding functionality to keep the dispersed plasticizer together, the labelstock may release solid particles of plasticizer during shear-providing activities, such as slitting, cutting, perforation, transport, and friction-causing web handling. Further, the functionality of the polymeric binder is essential. The inventors have found that especially preferred polymeric binders are water-soluble or water-dispersible, non-ionic polymeric binders have a high efficiency in keeping the dispersed particles bound to the detack layer when shear-providing influences are supplied to the detack layer.

The polymeric binder therefore is generally water soluble or well dispersable in water, and/or contains hydroxy groups. Examples for such polymers are polyvinyl alcohol, hydroxyacrylates and copolymers of vinylalcohol and/or hydroxyacrylates; typically, such copolymers may be statistical or block copolymers, in an exemplary embodiment consisting of at least 30% by weight repeating units containing a hydroxy group such as vinylalcohol, hydroxyalkylacrylate, hydroxyalkylmethacrylate. In a further embodiment the copolymer may contain at least 50% by weight repeating units containing a hydroxy groups discussed above. In an additional embodiment the copolymer may contain at least 70% by weight repeating units containing a hydroxy groups discussed above. In yet a further embodiment the copolymer may contain at least 90% by weight repeating units containing a hydroxy groups discussed above. Other embodiments may use polyvinyl alcohol (PVOH) as a component that can be obtained at various saponification degrees or ethylvinylalcohol (EVOH) or butyl vinyl alcohol BVOH or polyvinylpyrrolidone (PVP) or (block)-copolymers of these binders.

Other binders that are suitable for use in various exemplary embodiments are polyether-polymers, such as polyethylene oxide (PEO) and polypropylene oxides (PPO), and (block)-copolymers of these polyethers, such as the materials known under trade names such as Pluronic (BASF) and Synperonic (Croda).

In order to have a non-block effect prior to activation, the polymeric binder needs to have the properties of not having any tack. A high glass transition temperature is advantageous in this case, as that will lead to low tack. However, upon activation, the binder needs to be flexible enough to allow the plasticizer to quickly combine with the underlying adhesive. Therefore, in exemplary embodiments the binder has a glass transition temperature between about 25° C. and about 160° C. In further embodiments this glass transition temperature can be refined to between about 40° C. and about 140° C. In yet another embodiment, the glass transition temperature can be refined further to between about 50° C. and about 120° C.

The plasticizer:binder ratio is of utmost importance With a too low binder amount, the dispersion lacks stability, and the obtained dispersion quickly separates into a layer of solids and a supernatant. As mentioned above, a further function of the binder is to keep the dispersed particles together in the dried state.

If the binder amount is too high, the binder will prevent the combination of the adhesive layer with the activated detack layer. In an exemplary embodiment, the ratio plasticizer:binder is at least 99:1 by weight (1% binder based on total solids). In a further embodiment, the plasticizer:binder ratio is less than about 15:1 (6.25%). In an additional emboidment the plasticizer:binder ratio is less than about 20:1 (4.7%). In yet another embodiment the plasticizer: binder is less than about 32:1 (3%).

Tackifiers

The detack layer, or the adhesive layer, or both the adhesive and the detack layer can comprise at least one tackifier. In an exemplary embodiment the tackifiers have a melting point between about 50° C. and about 150° C. In another embodiment the tackifiers have a melting point between about 60° C. and about 130° C. In yet another embodiment, the tackifiers have a melting point between about 70° C. and about 120° C.

Representative, non-limiting examples of such tackifiers may include but is not limited to: hydrocarbon resins and rosin resins. Such tackifiers include, rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

A wide range of tackifiers are commercially available including, but not limited to, Foral® 85 (glycerol ester of a highly stabilized rosin), Foral® 105 (pentaerythritol ester of a hydrogenated rosin), Stabilite ester 10, and Pentalyn® H, manufactured and sold by Hercules, Inc., PE Estergum and the like, manufactured by Arizona Chemical Co., and Sylvatac® 40N, Sylvatac® RX, Sylvatac® 95 and the like, manufactured by Kraton Corporation.

There may also be employed as tackifiers terpene resins which are hydrocarbons of the formula $C_{10}H_{16}$, occurring in most essential oils and oleoresins of plants, and phenol modified terpene resins like alpha pinene, beta pinene, dipentene, limonene, myrcene, bornylene, camphene, and the like. Various aliphatic hydrocarbon resins like Escorez™ 1304, manufactured by Exxon Chemical Co., and aromatic hydrocarbon resins based on $C_9$'s, $C_5$'s, dicyclopentadiene, coumarone, indene, styrene, substituted styrenes and styrene derivatives and the like can also be used. Additionally, exemplary hydrogenated and partially hydrogenated resins can be used as tackifiers such as: Regalrez™ 1018, Regalrez™ 1033, Regalrez™ 1078, Regalrez™ 1094, Regalrez™ 1126, Regalrez™ 3102, Regalrez™ 6108, etc., produced by Eastman Chemical Company. Additionally, exemplary terpene phenolic resins can be used as tackifiers such as: Silvares TP 2040 manufactured and sold by Kraton Corporation, and Piccolyte® 5-100, manufactured and sold by DRT. Further, various mixed aliphatic and aromatic resins, such as Hercotex AD 1100, manufactured and sold by Hercules Corporation, can also be used as tackifiers.

In further embodiments the tackifier can be a pre-dispersed tackifier. Such tackifier dispersions are commercially available, for example Snowtack 110X manufactured and sold by Lawter Inc., AQUATAC™ 6085 manufactured and sold by Kraton Corporation, and Tacolyn 3400 manufactured and sold by Eastman Chemical Company.

A tackifier can be dispersed in a similar fashion as described for the plasticizer in this invention, using similar ingredients.

A third option for dispersing the tackifier is to disperse/emulsify the tackifier together with the plasticizer. In this case, the required binder amount is determined by the combined weight of plasticizer and tackifier.

In an exemplary embodiment when the tackfier is present in the detack layer, the ratio of plasticizer:tackifier on a weight to weight basis is between about 10:90 and 90:10. In an alternative embodiment, the ratio of plasticizer:tackifier on a weight to weight basis is between about 20:80 and 80:20. In a further embodiment the ratio of plasticizer:tackifier on a weight to weight basis is between about 25:75 and 75:25. In yet another embodiment the ratio of plasticizer:tackifier on a weight to weight basis is between about and most preferably between 40:60 and 60:40.

Adhesive Layer

Pressure-sensitive adhesives suitable for the pressure-sensitive adhesive layer of the invention are adhesives that are well known in the industry. Suitable adhesives are emulsion acrylic adhesives, hotmelt adhesives, solvent adhesive and UV-curable adhesives. They can be permanent, semi-permanent, or removable.

Upon melting, the ensemble of pressure-sensitive adhesive and activated detack layer (in which the plasticizer is now at least partly molten) interact with each other, and the ensemble as a whole becomes a pressure-sensitive adhesive, which retains at least part of these pressure-sensitive properties for an extended period of time upon cooling down to room temperature. Without being bound to theory, the inventors believe that the plasticizer functions once molten to combine with the underlying pressure-sensitive adhesive and thus lower the glass transition temperature ($T_g$) of the adhesive.

The adhesive layer can be applied directly adjacent to, and in contact with, the facestock or face layer. There can be intervening layers between the adhesive layer and the facestock. The label can include two or more layers of adhesive and/or facestock. In an exemplary embodiment, the adhesive layer of the label can be coated onto the facestock with a coat weight of about 3 g to about 60 g. In a further exemplary embodiment, the adhesive layer of the label can be coated onto the facestock with a coat weight of about 5 g to about 54.5 g. In yet another exemplary embodiment, the adhesive layer of the label can be coated onto the facestock with a coat weight of about 7.5 g to about 49 g. In an additional exemplary embodiment, the adhesive layer of the label can be coated onto the facestock with a coat weight of about 21.5 g to about 41.5 g. In yet another exemplary embodiment, the adhesive layer of the label can be coated onto the facestock with a coat weight of about 27 g to about 38 g.

Face Layer

Label face stock materials suitable for the face layer of the invention can be paper, plastics, or combinations thereof. Suitable plastic face materials are polypropylene, polyethylene, polyethylene terephthalate, polyvinylchloride, polylactic acid, polybutylene adipate terephthalate (PBAT), polylactic acid, polyhydroxyalkanoates, polybutylene succinate, cellulose-based materials, polyglycolic acid, polycaprolactone, polyvinyl alcohol, carbohydrate-based materials, protein-based materials, and combinations thereof.

Print-Facilitating Layer

The heat-activatable labelstock construction may further comprise layers that facilitate printing. Label printing is often done through flexographic printing, using UV-curable, waterborne, solvent-based or other types of ins. Also, inkjet printing, offset printing, screen printing, electrophotographic printing and letterpress printing are printing techniques that are common in the label printing industry.

To improve the anchorage, wetout, and/or in general the aesthetics of the printed matter, coatings and treatments can be applied to that side of the label that needs to be printed. In general, this will be the side of the face layer opposite the surface to which the adhesive is applied. Topcoatings suitable for label printing are known in the art. Typical examples can be found, for example, in EP-2,393,665 and EP-2,938,684.

Barrier Coats

The various labels and label systems described herein may further comprise one or more barrier coats or layers or primer coats or layers. Such coats or layers are beneficial during printing stages, particularly those employing direct thermal printing. Generally, a barrier coat prevents discoloration of the facestock and print under a wide array of conditions to which the label may be exposed. Preferably, the barrier coat prevents discoloration of the facestock and print upon exposure to temperatures of from about-20° C. to about 80° C., for times of up to several months or longer and preferably up to 1 year, and at humidity levels of from about 10% to 99%. Generally, such barrier coats comprise polymeric materials compatible with adhesives described herein and which include an effective concentration of styrene moieties. In certain embodiments, the adhesive and the barrier layer can be coated with one pass using dual die technology.

From a barrier functionality point of view, the usage in the barrier/primer layer of a polymer material bearing styrene units should be more compatible. A mixture of one to one weight ratio of HYCAR 26288 and HYCAR 26315, both available from Lubrizol Corp. of Cleveland, Ohio, is an example of a formulation for use as the barrier coating or layer. Both polymers include styrene moiety in their molecular backbone. A coat weight of the barrier layer also impacts the adhesive performance as well, since plasticizers will be absorbed by the barrier layer. Since plasticizer is "consumed" by the barrier layer, the higher the barrier layer coat weight, the lower the adhesive tack. In an exemplary embodiment, the barrier layer coat weight is below gsm. In a further exemplary embodiment, the barrier layer coat weight is in between 2 to 10 gsm. The barrier layer is preferably used to cover the adhesive and to seal capillaries of the facestock. For this reason, in exemplary embodiments polymeric substances having glass transition temperatures less than 80° C. are desired. In further exemplary embodiments the glass transition temperature is lower than 60° C.

Varnishes

In exemplary embodiments, a varnish may be applied over the print. These varnishes can cover the entire surface of the label, or only parts of the label. The function of the varnish is to protect the print against damages caused by abrasion or friction.

In one embodiment, the varnish has optional release properties. This will help in unwinding the label reel post-printing in the case of unwanted activation. Varnishes with release properties are well known in the art, and may include, but are not limited to Nutriflex Release varnish E01 (from Siegwerk), or Release Varnish UVF02051, available from Flint.

Methods

Exemplary embodiments are directed to methods of preparing a labelstock comprising a face layer and an adhesive layer comprising: melt-emulsifying a plasticizer and a polymeric binder at a temperature above the melting point of the plasticizer to form an emulsified dispersion; and applying the emulsified dispersion to the adhesive layer to form a detack layer on the adhesive layer.

In yet another exemplary embodiment, methods are directed to preparing a labelstock comprising a face layer, comprising: melt-emulsifying a plasticizer and a polymeric binder at a temperature above the melting point of the plasticizer to form an emulsified dispersion; and simultaneously applying the emulsified dispersion and an adhesive layer to form a detack layer on the adhesive layer;

Various methods can be used to disperse the plasticizer. While grinding is possible (wet or dry grinding), the inventors have learned that these processes are cumbersome or do not produce the required particle size suitable for coating. The inventors have found that emulsification at elevated temperatures, i.e. temperatures above the melting point of the plasticizer, provides a detack layer dispersion in an efficient manner. In the so called melt-emulsification process, the future disperse phase is melted and dispersed into droplets, the size of which is controlled by the conditions.

Various methods are known in the art to emulsify and/or disperse liquids and solids. Particularly useful for the invention is the use of high speed emulsification using dissolver blades or rotor-stator emulsifiers. A further suitable method is the use of ultrasonic emulsification or ultrasonic dispersion. Suitable equipment can be obtained from Hielscher Ultrasound Technology of Germany, such as the ultrasonic processor UIP500hdT.

Another method of producing an oil-in-water emulsion is by means of inverse melt emulsification: the plasticizer is molten, and a concentrated solution of dispersant and optionally an emulsifier is added. Then, a water-in-oil emulsion is obtained, to which a further amount of water is added. This second water addition may comprise a binder, such as polyvinyl alcohol. Due to this larger amount of water, the emulsion will change from a water-in-oil emulsion to an oil-in-water emulsion. This process usually yields a very narrow particle size distribution.

For materials that have a melting point around or above 100° C., it may be impractical or impossible to emulsify the plasticizer and/or tackifier, as these solid materials are not in a liquid state. In that case emulsification can be done under elevated pressure.

Another option is the use of a suitable co-solvent, in which the tackifier and/or plasticizer is dissolved. The emulsification is then carried out at temperature below the lowest boiling point of either water or the co-solvent, after which the co-solvent is removed by distillation. This distillation can be done under vacuum.

The particle size of the dispersed phase is important. Determination of the volume-based particle size distribution can be done with a Mastersizer 3000 (Sysmex Nederland BV), according to methods well known in the art. The D90 (the common denotation of the particle size at which 90% of the particles have a smaller particle size), as measured with the Mastersizer 3000, should preferably be between 0.2 and 100 micrometers, more preferably between 0.6 and 50 micrometers, more preferably between 1 and 30 micrometers.

When the melt-emulsification process is used for creating the plasticizer dispersion, contrary to the well-known wet grinding process, a post-dispersion crystallization may take place. After making the dispersion at the temperature above the melting point of the plasticizer, the dispersion is cooled down below the melting point of the plasticizer, and the plasticizer solidifies. The plasticizer solidifies in amorphous form, in crystalline form, or in a combination of both.

The presence of crystalline material after the melt emulsification and the subsequent cooling and coating/drying has benefits. Namely, the amorphous plasticizer lacks a distinct and well-defined melting point, which makes it more prone to blocking at lower temperatures. Further, the crystalline plasticizer in or on the surface of the detack layer has a more defined and sharper melting point, and consequently has a better blocking resistance.

After coating and drying, the crystals are present inside the detack layer, but also on the surface. The amount of crystals on the surface should not be too high. Too many crystals on the surface of the coated and dried detack layer will result in crystals not well attached to the detack layer, and will lead to unwanted dust formation.

The plasticizer typically crystallizes in the form of needle-shaped crystals, with a high aspect ratio. The aspect ratio of a crystal describes its visible external shape. It can apply to an individual, discrete crystal, or to an aggregate of crystals. It can apply to a crystal visualized by any of a number of means, including but not limited to the naked eye, optical microscopy, electron microscopy, and nanoindentation.

A crystal with a "high aspect ratio" is a crystal that has a major dimension length and a minor dimension length, such that the major dimension length is about at least three (3) times longer than the minor dimension length. The aspect ratio of the crystal can vary and be tailored with reaction conditions. The aspect ratio is expressed as the ratio between the major dimension length and the minor dimension length of the crystal. In an exemplary embodiment, the aspect ratio of the plasticizer crystals that cover the surface of the detack layer is typically between about 3 and about 100. In an additional embodiment the aspect ratio of the plasticizer crystals that cover the surface of the detack layer is between about 5 and about 50.

Typically, the coated products show the presence of high aspect ratio crystals on the surface of the detack layer. In an exemplary embodiment, the surface area of the coated and dried detack layer shows between about 1 and about 90% of the total surface area covered by high aspect ratio crystals. In an additional embodiment, between about 2 and about 50% of the total surface area is covered by high aspect ratio crystals. In yet a further embodiment, between 4 and 20% of the total surface area is covered by high aspect ratio crystals. In yet an additional embodiment, between 5 and 15% of the total surface area is covered by high aspect ratio crystals. For determining the surface area coverage, well-known techniques are available, such as the usage of the software program ImageJ.

Figure 2:
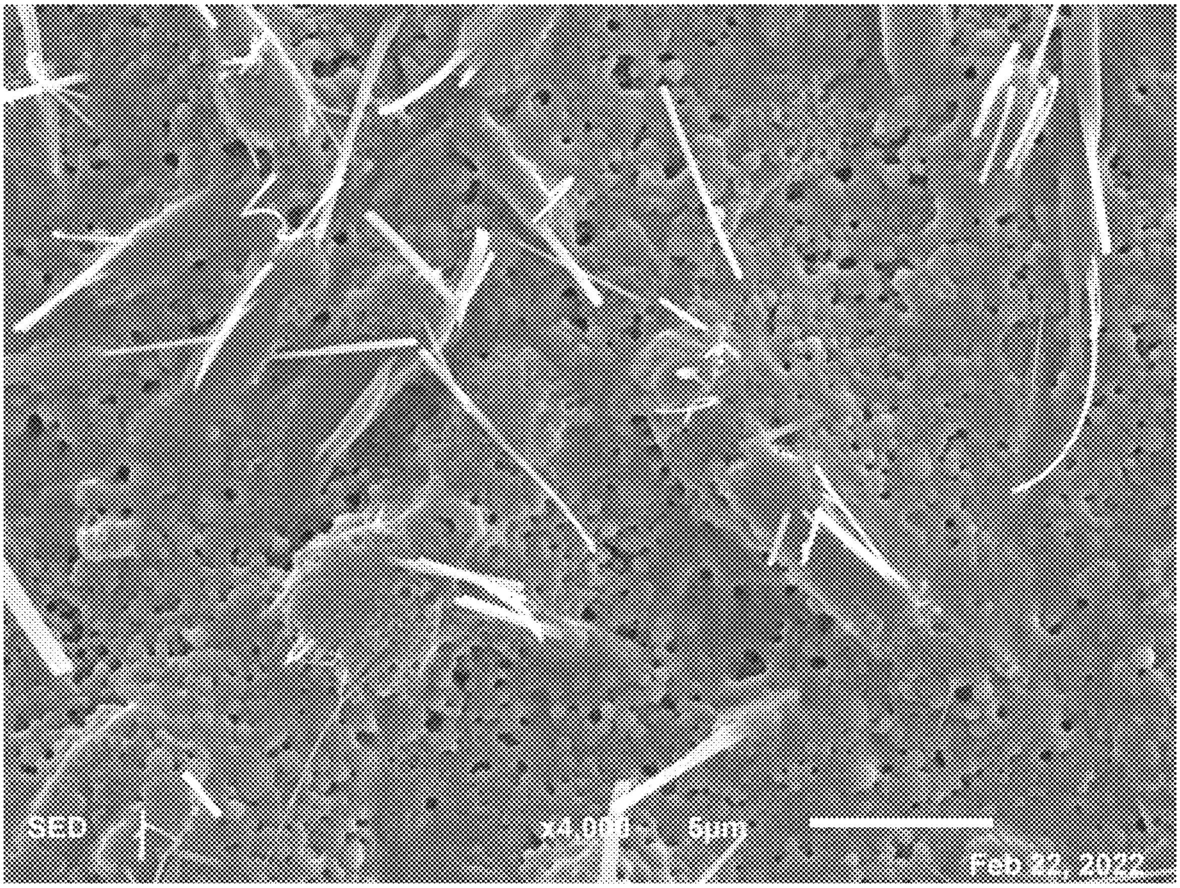
FIG. 2 illustrates an exemplary appearance of plasticizer crystals with a good blocking resistance and a high activatability provided by an electron microscope.

As an exemplary embodiment and for illustrating a non-limiting example of the appearance of these type of crystals that provide the sharply defined melting point, with an acceptable blocking resistance and a high activatability is provided by the electron microscope picture in FIG. 2.

The coating of the detack layer can be done using methods known in the industry: gravure coating, die coating, roll coating etc. The coating can be applied on a web already containing a dried pressure-sensitive adhesive.

Another possibility is to coat in the so-called dual layer mode, in which in the same coating equipment (e.g. a dual slot-die) a layer of pressure-sensitive adhesive and a layer of detack are deposited at the same time. A potential configuration for coating in dual layer mode is given in FIG. 3. In this case, the detack layer is coated from slot 52*a*, the adhesive layer is coated from slot 52*b* on a moving face layer 24. The layers are then dried. Drying of the detack layer, or in case of coating in dual-layer mode, the adhesive together with the overlaying detack layer, needs to be done at temperatures well below the melting temperature of the plasticizer and/or tackifier. When no tackfier is used in the detack layer, preferably, the maximum web temperature of the detack layer in the dryer is at least 10° C. lower than the melting point of the plasticizer; more preferably at least 14° C. lower than the melting point of the plasticizer; or most preferably at least 18° C. lower than the melting point of the plasticizer.

Figure 3:
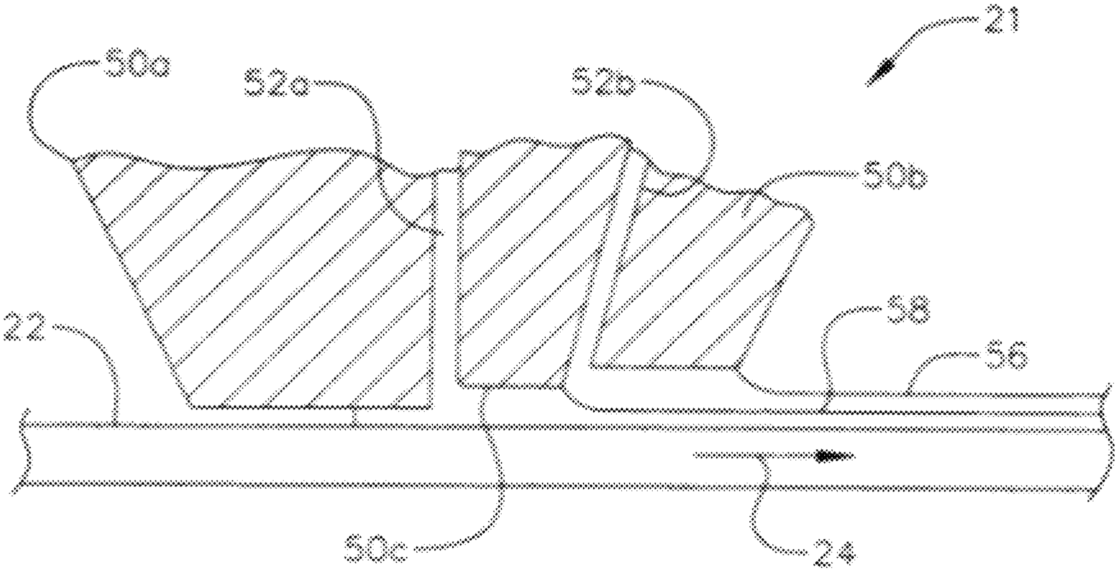
FIG. 3 illustrates an exemplary embodiment where the pressure sensitive adhesive layer and the detack layer are applied in a dual layer mode.

Referring to FIG. 3, a close-up cross-sectional view of a multilayer die 21 which may be also utilized in accordance with the present disclosure adjacent to moving substrate 22 traveling in the γ direction 24. The die 21 includes upstream and downstream die sections 50*a* and 50*b*, as well as a middle section 50*c* separating the two. Formed between these various sections are an upstream feed gap 52*a* and a downstream feed gap 52*b*. The liquid from upstream feed gap 52 a flows onto the substrate 22 to form a bottom layer 58, while the liquid from the downstream feed gap 52*b* flows onto the bottom layer to form a top layer 56.

In case a tackfier is used in the detack layer, next to the plasticizer, the maximum web temperature of the detack layer in the dryer in an exemplary embodiment is at least 10° C. lower than the lowest melting point of either the plasticizer or the tackifier. In an additional embodiment the maximum web temperature of the detack layer in the dryer the is at least 14° C. lower than the lowest melting point of either the plasticizer or the tackifier. In yet another embodiment, the maximum web temperature of the detack layer in the dryer the is at least 18° C. lower than the lowest melting point of either the plasticizer or the tackifier.

The coat weight of the detack layer needs to be high enough to fully cover the underlying pressure-sensitive adhesive. Also, there is a need to minimize the thickness of the detack layer as thick detack layers require more energy to activate and will cost more. In an exemplary embodiment, the dry coat weight of the detack layer is between 3 gsm and 20 gsm. In a further exemplary embodiment, the dry coat weight of the detack layer is between 4 gsm and 15 gsm. In another exemplary embodiment, the dry coat weight of the detack layer is between 5 gsm and 13 gsm.

Once the adhesive is activated by radiation or other energy source, the plasticizer stays in liquid form and may migrate from the detack layer to its contact area. The higher the temperature, the faster the migration. Thus, the barrier layer covers an adhesive side of the label, seals capillaries of facestock and serves as a barrier to minimize plasticizer migration from the adhesive side to the print side of the label. Poly(vinyl alcohol) is a very commonly used material for an oxygen permeability barrier and dye migration barrier.

For improving the speed of activation, it may be possible to add ingredients into one of the layers of the heat-activatable construction. Particularly when using infrared radiation to generate heat, it may be advantageous to include an IR-absorber in one of the layers. The heat absorber can be added to the face layer, or in the barrier layer, or in the adhesive layer, or in the detack layer, or in any combination of these layers.

Suitable IR absorbers include graphite and carbon black. In the event that the activatable linerless label adhesive or the detack layer contains carbon black or graphite. In an exemplary embodiment concentrations of carbon black or graphite range from about 0.01% to about 0.1% based on dry weight ratio (IR-absorber:other components in the detack layer and/or adhesive layer). In an additional exemplary embodiment the concentrations of carbon black or graphite range from about 0.02% to about 0.08%. A wide array of commercially available sources of carbon black may be used, including but not limited to, carbon black from Cabot Corporation of Boston, Mass or AURASPERSE W-7012, available from BASF Corporation of Florham Park, N.J.

For heat activation, various techniques are known, including, for example, hot air blowing devices, heated drums or rollers (U.S. Pat. Nos. 5,749,990 and 5,480,502), direct contact with the heating element (see U.S. Pat. Nos. 6,388,692 and 6,501,495), microwave energy (U.S. Pat. No. 3,461,014), heated belts in contact with the adhesive (U.S. Pat. Nos. 4,468,274 and 6,031,553), and infrared ("IR") and near infrared radiation ("NIR") (U.S. Pat. Nos. 3,247,041, 4,156,626, 8,927,100).

In addition, general methods for heating using radio frequency ("RF") energy, inductive heat, radiant heat, and visible light also are well known and could be applied to this list of activation methods.

For practical purposes, the time that the activating and subsequently cooling down of the pressure-sensitive adhesive and detack layer needs to be longer than about 2 seconds. In an exemplary embodiment, the activating and subsequently cooling down of the pressure-sensitive adhesive and detack layer needs to be longer than longer than 10 seconds. In another embodiment, the activating and subsequently cooling down of the pressure-sensitive adhesive and detack layer needs to be longer than 1 minute. In yet another the activating and subsequently cooling down of the pressure-sensitive adhesive and detack layer needs to be longer than 10 minutes. When properly treated, once activated and subsequently cooled down the article will retain pressure-sensitive adhesive properties for at least a year. Through controlled activation and cooling, crystal formation, or lack thereof, is able to be tailored to desired levels.

To apply the labels to an item, the labels are typically placed on a delivery device or actuator. These delivery devices include blower systems (U.S. Pat. No. 4,784,714), conveyor belts (U.S. Pat. No. 5,895,552), paddles (U.S. Pat. No. 5,922,169), plungers (U.S. Pat. No. 6,006,808), carrier sheets (U.S. Pat. No. 7,029,549), vacuum drums (U.S. Pat. No. 6,899,155), rollers (U.S. Pat. No. 5,964,975), vacuum heads or belts (U.S. Pat. No. 6,471,802).

The heating of the heat activatable labelstock needs to make sure that the detack layer reaches the temperature at which the components of the detack layer are activated, without impairing the underlying adhesive or face layer. To achieve activation, the web temperature of the detack layer needs to be at least 50° C. The temperature of the detack layer should not exceed 175° C., in order to avoid damage to the underlying adhesive and face layer.

The items to which a label can be applied can include, for example, boxes, parcels, envelopes, pouches, bags, vessels, containers, cans, and bottles.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

In a 2-I thermostat beaker equipped with a rotor/stator emulsification head, 183 g Joncryl HPD-71E (a polymeric acrylic dispersant with a high $T_g$, available from BASF) was mixed with 273.5 g water and 3.18 g defoamer, and this mixture was heated up to 90° C. To this mixture, 260 g of molten glycerol tribenzoate (Uniplex 260 from Lanxess) at a temperature of 90° C. was added. This mixture was emulsified at a speed of 10000 rpm (tip speed 12 m/sec) at 90° C. for 30 minutes.

In a second vessel, 5.2 g PVOH (Poval 95-88 from Kuraray, equal to 2% of the plasticizer amount) was added to 200 g cold water, after which, while stirring, the temperature was raised to 90° C., and kept at this temperature until the PVOH was dissolved. This mixture was then slowly added to the emulsion obtained above.

After the addition was complete, the mixture was allowed to cool down while stirring. After cooling down, a mixture of 10 g Rheo 8600 (obtained from Tego) and 50 g water was slowly added, and left to stir for another 30 minutes.

This mixture was coated with a Meyer rod providing a wet coat weight of 21.4 g on an adhesive coated facestock. The facestock was a 60-micron polypropylene; the adhesive was a 10 g layer of acResin A 250 UV, cured at 30 mJ/cm$^2$. The dry coat weight of the detack layer was 8 g.

The coated facestock then was dried for 5 minutes in a convection oven with an air temperature of 57.5° C. Upon inspection, the surface of the detack layer showed the presence of needle-shaped crystals.

The obtained material was substantially free of tack. Upon application of heat (hot plate, 130° C., 30 seconds) the adhesive was fully activated. Application of the activated material on a HDPE testpanel provided a good adhesion. Blocking tests carried out at 3.4 bar/50° C./1 week conditions showed acceptable blocking behavior: the individual sheets did not show significant adhesion to each other.

This behavior did not change upon aging of the coated sample.

Example 2

In a similar fashion as example 1 a detack layer was deposited, but in this case the amount of Poval 95-88 in the 200 g water was increased to 20 g (7.7% of the plasticizer amount).

The sample was substantially free of tack, and could be activated in a similar fashion. However, upon aging (5 days at 20° C.), the sample proved no longer activatable.

Example 3

In a 2 L beaker equipped with a rotor/stator emulsification head, 183 g Joncryl HPD-71E (a polymeric acrylic dispersant with a high $T_g$, available from BASF) was mixed with 273.5 g water and 3.18 g defoamer, and this mixture was heated up to 90° C. To this mixture, 130 g of molten glycerol tribenzoate (Uniplex 260 from Lanxess) at a temperature of 90° C. was added, together with 130 g molten Foral 85 (a rosin ester tackifier, obtained from Eastman Chemical, also at 90° C.). This mixture was emulsified at a speed of 10000 rpm (tip speed 12 m/sec) at 90° C. for 30 minutes.

In a second vessel, 5.2 g PVOH (Poval 95-88 from Kuraray, equal to 2% of the plasticizer amount) was added to 200 g cold water, after which, while stirring, the temperature was raised to 90° C., and kept at this temperature until the PVOH was dissolved. This mixture was then slowly added to the emulsion obtained above.

After the addition was complete, the mixture was allowed to cool down while stirring. After cooling down, a mixture of 10 g Rheo 8600 (obtained from Tego) and 50 g water was slowly added, and left to stir for another 30 minutes.

This mixture was coated with a Meyer rod providing a wet coat weight of 21.4 g on an adhesive coated facestock. The facestock was a 60-micron polypropylene; the adhesive was a 10 g layer of acResin A 250 UV, cured at 30 mJ/cm$^2$. The dry coat weight of the detack layer was 8 gsm.

The coated facestock then was dried for 5 minutes in a convection oven with an air temperature of 57.5° C. Upon inspection, the surface of the detack layer showed the presence of needle-shaped crystals.

The obtained material was substantially free of tack. Upon application of heat (hot plate, 130° C., 30 seconds) the adhesive was fully activated. Application of the activated material on a HDPE test panel provided a good adhesion. Blocking tests carried out at 3.4 bar/50° C./1 week conditions showed acceptable blocking behavior: the individual sheets did not show significant adhesion to each other.

Compared to the material from Example 1, this material showed a higher clarity after activation. This behavior did not change upon aging of the coated sample.

Example 4

In a 1-liter beaker equipped with a magnetic stirrer, 91.3 g water was mixed with 0.48 g defoamer, 72.06 g Joncryl HPD-71E, and 6.8 g Disponil FES77. This mixture was heated up to 80° C. To this mixture, 79.38 g Uniplex 260 which had been heated up to 80° C. was added. Emulsification was carried out using a Hielscher UIP500hdT ultrasonic dispersing unit. After applying 7.5 Wh of energy, which took about 5 minutes to complete, a particle size was reached with a D90 of 2.9 micrometer. The mixture was then allowed to cool to 50° C., upon which 19.4 g of a 10% by weight solution of Poval 95-88 (a polyvinyl alcohol polymer available from Kuraray) was added under stirring, and the mixture was further cooled down.

The thus obtained emulsion showed excellent stability in particle size.

To this mixture, 146.1 g Snowtack 100G (a tackifier dispersion available from Lawter) was added. The resulting dispersion was coated according to the method described above. The face layer was a clear PET 30 micron. Upon inspection, the surface of the detack layer showed the presence of needle-shaped crystals. Excellent activation and tack was obtained. Blocking tests carried out at 3.4 bar/50° C./1 week conditions showed acceptable blocking behavior: the individual sheets did not show significant adhesion to each other. Activation was complete within 0.5 seconds after exposing the adhesive to a heated plate that touched the label material on the uncoated side.

Example 5

In a 2 liter PE container, 91.3 g water was mixed with 0.48 g defoamer, 72.06 g Joncryl HPD-71E, 6.8 g Disponil FES77. and 79.38 g Uniplex 260 were added. To this, 400 g of milling media (2 mm Ce-stabilized ZrO2) were added, and the closed container was kept on a rolling table at room temperature until the desired particle size (D90<5 micrometer) was obtained. This process took about 16 hrs to complete.

After removal of the grinding media, 19.4 g of a 10% by weight solution of Poval 95-88 and 146.1 g Snowtack 100G were added under stirring. The resulting dispersion was coated according to the method described above. The face layer was a clear PET 30 micron.

The resulting coating did not show any sign of needle-shaped crystals. While the material was activatable, providing good tack and peel, the blocking characteristics were poor. Blocking tests carried out at 3.4 bar/50° C./1 week showed that the individual layers were sticking to each other and were difficult to peel apart. Adhesive transfer was observed in several samples.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Example 6

Crystallization speed of a plasticizer is carried out by mixing a plasticizer (glycerol tribenzoate (Uniplex 260 from Lanxess) 10 g) with the appropriate amount of additive in an aluminum dish, and heating the dish in an oven at 90° C. for 1 hr. After all the ingredients have molten, the contents of the dishes are mixed, and the dishes are removed from the oven and allowed to cool to ambient temperature. The dish is then observed for changes in appearance, such as viscosity, transparency and tack. Solidification speed is then judged by the time it takes to show changes in this appearance.

In this experiment, representing the class of long-chain aliphatic esters of aliphatic polyols, glycerol monostearate (GMS, obtained from Castor International) and a mix (45:55% by weight) of glycerol mono- and di-stearate (GMDS, obtained from Castor International) was used.

As can be observed from Table 1 below, a small amount of an aliphatic long chain ester of an aliphatic polyol can increase the solidification speed of the plasticizer significantly.

TABLE 1

| Amount of additive (grams) | GMS | GMDS |
|---|---|---|
| 0 | Material stays liquid for 24 hrs before solidifying | |
| 0.1 | Material becomes turbid within 2 hrs | Material becomes turbid within 3 hrs |
| 0.2 | Material becomes turbid within 30 minutes | Material becomes turbid within 1 hr |
| 0.5 | Material becomes turbid within 10 minutes | Material becomes turbid within 20 minutes |

Example 7

In a 1 L beaker equipped with a magnetic stirrer, 91.3 g water was mixed with 0.48 g defoamer, 72.06 g Joncryl HPD-71E, and 6.8 g Disponil FES77. This mixture was heated up to 80° C. To this mixture, a mixture of 79.38 g Uniplex 260 and 1.58 g Glycerol monostearate which had been heated up to 80° C. was added. Emulsification was carried out using a Hielscher UIP500hdT ultrasonic dispersing unit. After applying 7.5 Wh of energy, which took about 5 minutes to complete, a particle size was reached with a D90 of 3.5 micrometers. The mixture was then cooled to 5° C. within 30 seconds, upon which 19.4 g of a 10% by weight solution of Poval 95-88 was added under stirring. The thus obtained emulsion showed excellent stability in particle size. To this mixture, 146.1 g Snowtack 100G was added. The resulting dispersion was coated according to the method described above. The face layer was a clear PET 30 micron.

Excellent activation and tack was obtained. Blocking tests carried out at 3.4 bar/50° C./1 week conditions showed acceptable blocking behavior: the individual sheets did not show significant adhesion to each other. Activation was complete within 0.5 seconds after exposing the adhesive to a heated plate that touched the label material on the uncoated side.

We claim:

1. A heat-activatable labelstock, comprising:

a face layer having a first surface and a second surface opposite the first surface;

an optional barrier layer or optional primer layer, each with a first surface and a second surface opposite the first surface, the second surface in direct contact with the first surface of the face layer;

a pressure-sensitive adhesive layer having a first surface and a second surface;

wherein the adhesive layer is deposited on the first surface of the face layer, or, when the optional barrier layer or primer layer is present, on the first surface of the barrier layer or the primer layer;

a detack layer;

wherein the detack layer is deposited on the second surface of the adhesive layer; and wherein the detack layer comprises a dispersed plasticizer having a melting point between 70° C. and 120° C. and a non-ionic water-soluble polymeric binder comprising polyvinyl alcohol, wherein upon heating the detack layer above the melting point of the plasticizer, the molten plasticizer combines with the pressure-sensitive adhesive layer wherein a weight ratio of the plasticizer to the polymeric binder in the detack layer is greater than 15:1.

2. A heat activatable labelstock, comprising:

a face layer having a first surface and a second surface opposite the first surface;

barrier layer or primer layer, each with a first surface and a second surface opposite the first surface, the second surface being in direct contact with the first surface of the face layer;

a pressure-sensitive adhesive layer having a first surface and a second surface; wherein the pressure-sensitive adhesive layer is deposited on the first surface of the barrier layer or the primer layer;

a detack layer;

wherein the detack layer is deposited on the second surface of the adhesive layer;

wherein the detack layer comprises a dispersed plasticizer and a polymeric binder; and wherein a weight ratio of the plasticizer to the polymeric binder in the detack layer is greater than 15:1 (maximum 6.25 weight % binder/plasticizer).

3. The heat-activatable labelstock of claim 1, wherein the detack layer further comprises a dispersant.

4. The heat-activatable labelstock of claim 3, wherein the dispersant is a polymeric dispersant.

5. The heat-activatable labelstock of claim 1, wherein the detack layer further comprises an emulsifying surfactant.

6. The heat-activatable labelstock of claim 1, wherein the plasticizer has a melting point of 80° C. to 115° C.

7. The heat-activatable labelstock of claim 1, wherein the plasticizer has a melting point of 85° C. to 110° C.

8. The heat-activatable labelstock of claim 1, wherein the detack layer further comprises a tackifier.

9. The heat-activatable labelstock of claim 8, wherein the weight ratio of plasticizer:tackifier is 1:10 and 10:1.

10. The heat-activatable labelstock of claim 8, wherein the tackifier has a softening point is 60° C. to 120° C., as measured according to the Ring & Ball method.

11. The heat-activatable labelstock of claim 1, wherein the pressure-sensitive adhesive layer comprises an adhesive selected from the group consisting of an emulsion adhesive, a solvent-based adhesive, a UV-curable adhesive, a hotmelt adhesive, and combinations thereof.

12. The heat-activatable labelstock of claim 1, wherein the pressure-sensitive adhesive comprises a tackifier and a ratio between the plasticizer to the tackifier on a weight to weight basis is between about 10:90 and 90:10.

13. The heat-activatable labelstock of claim 1, wherein the face layer comprises a material selected from the group consisting of paper, a polyethylene film, a polypropylene film, a polyester film, a polylactate film, and combinations thereof.

14. A self-adhesive label material, obtained by heating a heat-activatable labelstock of claim 1 to a temperature of 50° C. to 175° C.

15. The self-adhesive label material of claim 14, characterized in that the heating step takes less than 1 second.

* * * * *